A. J. LEWIS.
METHOD OF ASSEMBLING SPRINGS IN FASTENER MEMBERS.
APPLICATION FILED MAY 31, 1919.

1,357,173.

Patented Oct. 26, 1920.

INVENTOR
Arthur J. Lewis
BY
ATTORNEY

UNITED STATES PATENT OFFICE.

ARTHUR J. LEWIS, OF STRATFORD, CONNECTICUT.

METHOD OF ASSEMBLING SPRINGS IN FASTENER MEMBERS.

1,357,173.  Specification of Letters Patent.  Patented Oct. 26, 1920.

Application filed May 31, 1919. Serial No. 301,012.

*To all whom it may concern:*

Be it known that I, ARTHUR J. LEWIS, a citizen of the United States, residing at Stratford, county of Fairfield, State of Connecticut, have invented an Improvement in Methods of Assembling Springs in Fastener Members, of which the following is a specification.

This invention relates to the manufacture of the socket members of snap fasteners, so called, the socket members of which are provided with wire springs of peculiar formation which lock the shanks of the other fastener members in engagement with said socket members.

In Letters Patent No. 1,305,132, granted to me May 27, 1919, is disclosed an improved method of forming the wire springs employed in snap fastener socket members of the type above referred to and for inserting said springs into said socket members, and the present invention relates particularly to improvements in the latter step of the process, namely, that of assembling the springs in the fastener members.

The more particular objects of the invention will best be understood from the following explanation of one mode of carrying the same into effect, reference being had to the accompanying drawings in which.

Figure 7:
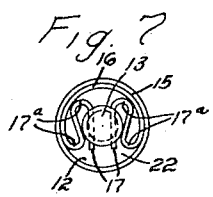
Fig. 7 is an enlarged plan view of a complete fastener member.

While the method constituting the present invention may be employed in inserting springs into other small spring receiving articles, the same has more particular reference to the introduction of springs into snap fastener socket members of the type shown in Fig. 7. A socket member of the type referred to comprises a sheet metal disk 12 having a central hollow stud 13 constituting the socket proper and provided with diametrically opposite slots 14, said disk having an upwardly turned peripheral edge portion, or flange 15 inclosing a wire spring 16, it being understood that, after the insertion of said spring, the edge 15 may be bent downwardly thereover to retain the same in place. The spring 16 is of roughly semi-circular form, having an outer coil 16ª engaging the edge 15 of the fastener member, the ends of said coil being bent inwardly and outwardly upon themselves to form a series of convolutions 17ª, and the free terminals 17 thereof being, in the completed fastener, received in the slots 14 of the central stud 13.

Figure 2:
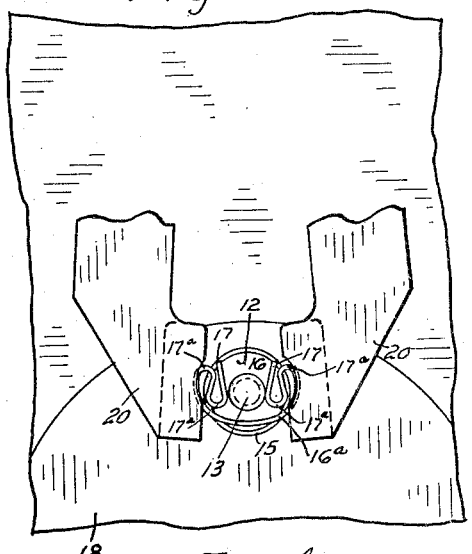

As disclosed and claimed in my copending application filed May 31, 1919, Serial No. 301,014, the springs 16 are initially formed with their outer coils 16ª somewhat flatter than the form assumed when the spring is in its final position in the fastener member, the spring as a whole being consequently of a slightly elliptical form with a major diameter somewhat exceeding the diameter of the fastener member into which it is to be inserted, as will be clear from a comparison of Figs 2 and 7, so that the expanded spring must be compressed slightly when the same is inserted into the fastener (such compression, however, being insufficient to exceed the elastic limit of the spring), such spring being thereafter retained in the device under a permanent resilient compression, which not only serves to resist accidental dislodgment of the spring from the fastener member, but increases the effective strength of the terminals 17, causing them to perform their intended function with increased reliability.

It will be observed that in order to insert a spring of the form shown into a socket member of the character under consideration, it is necessary to compress the terminals 17 outwardly in order to permit the same to pass over the central stud 13 and snap into place in the slots 14. It therefore follows that said terminals 17, as also the several convolutions 17ª, must, during the insertion of the spring, pass through the somewhat restricted annular space 22 between the central stud 13 and the peripheral edge 15. It will also be noted that, when the spring is inserted, the outer coil thereof must be confined within the periphery of the socket member, and where an over-size spring is employed the outer coil thereof must be compressed inwardly to within the compass of the socket member. If the inward compression of the outer coil of the spring and the outward compression of the terminals 17 thereof take place simultaneously and the entire spring is crowded at one time into the restricted annular space 22, it will be seen that the convolutions 17ª will be subjected to a considerable strain which may be so excessive as to result in a permanent set, materially impairing the efficiency of the device. In order to avoid this difficulty, and as disclosed and more broadly claimed in my copending application filed May 31, 1919, Serial No. 301,011, the spring as a whole is not forced into the socket member all at once, but the terminals 17 are preferable first inserted into the fastener member and about the stud 13, the outer coil 16ª being at this time fully expanded or under only slight compression, and thereafter the outer coil is compressed and forced into place in engagement with the peripheral edge 15 of the fastener, the terminals 17 being at this time free to expand downwardly into the fastener and laterally into the slots 14. In this manner it will be seen that the insertion of the several parts of the spring may be caused to take place successively instead of simultaneously, thereby avoiding excessive strain upon the spring.

Figure 1:
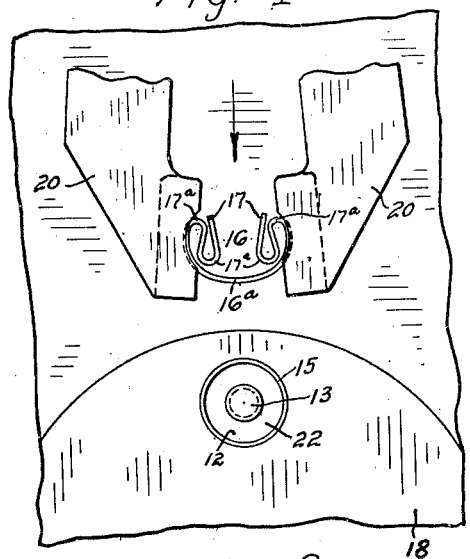
Figures 1 and 2 are diagrammatic plan views.
Figure 3:
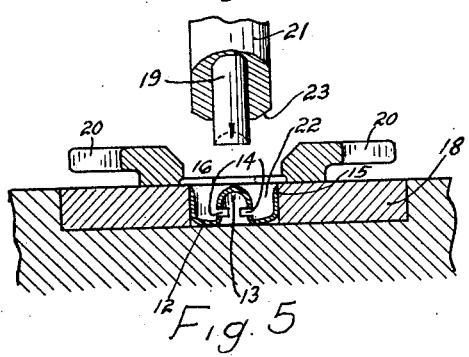
Figs. 3, 4, 5, and 6 are sectional views, illustrating different steps in the process of inserting a spring into a fastener member.
Figure 4:
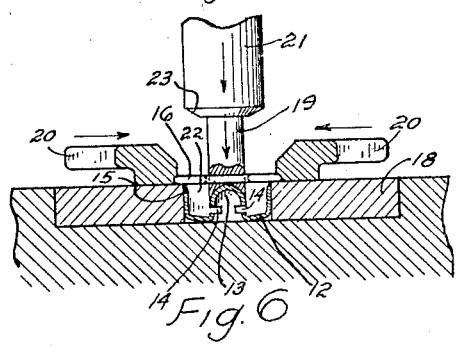

In accordance with the present invention the foregoing operations are performed as follows. The fastener member 12 into which a spring is to be inserted is held in any suitable work-holding device, as for example, a bed or carrier plate 18 having a recess to receive said fastener. A spring 16 in expanded condition is held between a pair of suitably formed plier or other jaws 20 (which jaws may be either mechanically or manually operated), as shown in Fig. 1, with the outer coil 16ª foremost or directed toward the fastener member 12, and said jaws moved in the direction of the arrow on Fig. 1 to bring said spring immediately over said socket member, as shown in Figs. 2 and 3. With the spring in the expanded condition shown, the terminals 17 are separated by a distance approximately equal to the diameter of the central stud 13. A suitable mandrel 19 of substantially the same diameter as the central stud 13, and preferably provided with a recessed end to fit the head of said stud, is inserted between the terminals 17 into engagement with the head of said stud, as shown in Fig. 4. Thereupon the jaws may be moved toward one another, as indicated by the arrows on Fig. 4, to compress the outer coil 16ª of the spring 16 about the mandrel 19 into a sufficiently small compass to be received within the edge 15 of the fastener member, and the spring forced downwardly into said member. The insertion of the spring is accomplished in such a manner that the terminals 17 will first pass from the mandrel 19 over the central stud 13, eventually snapping into the slots 14 of the latter, and, after the complete or partial insertion of the terminals 17, the outer coil 16ª will seat itself within the peripheral edge 15.

Figure 5:
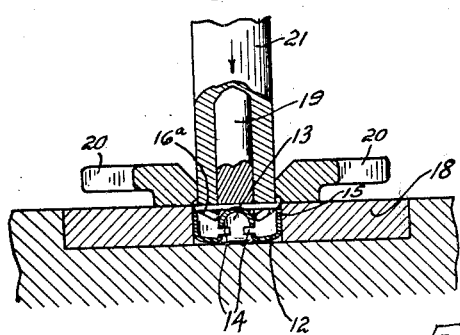
Figure 6:
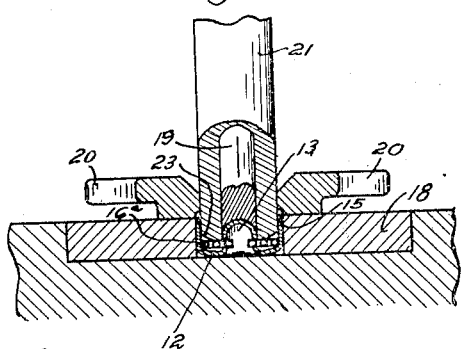

The operations last referred to may be conveniently performed by means of an annular tool or plunger 21 of an interior diameter corresponding approximately to the exterior diameter of the mandrel 19 and an exterior diameter approximately equal to the inside diameter of the flange 15, said tool being movable downwardly over the mandrel 19, as indicated by the arrow on Figs. 4 and 5, and between the jaws 20, to force the spring 16 downwardly from said jaws and into the socket member, as shown in Fig. 6, without permitting expansion of said spring until it is substantially in place. The plunger 21 may be formed with a beveled lower edge 23, so that, when said plunger is depressed, the central portion thereof will force the terminals 17 from the mandrel 19 into position about the stud 13 and eventually opposite the slots 14. During the latter portion of this operation the jaws 20 are brought together to contract or compress the outer coil of the spring to within the compass of the fastener member, the terminals 17 being at this time free to expand downwardly into the fastener member and laterally into the slots 14, and the outer portion of the plunger 21 finally forces the outer coil of the spring to its seat in the socket member.

The downward movement of the plunger 21 and the inward movement of the jaws 20 preferably take place simultaneously, as indicated by the arrows on Fig. 4, but these movements are so timed that the inner portion of the spring is engaged and forced downwardly by the inner portion of the plunger 21 before the outer coil thereof is fully compressed by the jaws 20 and engaged by the outer portion of said plunger.

From the foregoing it will be seen that, by the use of the mandrel 19 against which any inward compression of the spring takes place and by which the terminals are guided into place, the insertion of a small spring under the necessary tension is greatly facilitated and may be greatly expedited, so that the operation of inserting springs into successive fastener socket members may be carried on with considerable rapidity.

Having thus described my invention, I claim:

1. The herein described method of inserting springs into spring receiving articles, which consists in compressing a spring about a mandrel held in contact with the article to receive said spring and forcing said spring from said mandrel into said article.

2. The herein described method of inserting springs into spring receiving articles having central studs, which consists in compressing a spring about a mandrel held in engagement with the central stud of an article to receive said spring and forcing said spring from said mandrel into said article and about said stud.

3. The herein described method of inserting springs into spring receiving articles, which consists in holding an expanded spring between a suitable pair of jaws immediately over an article to receive said spring, contracting said jaws to compress said spring about a mandrel held in contact with said article and forcing said spring from said jaws and mandrel into said article.

4. The herein described method of applying springs having outer coils and free inner terminals to spring receiving articles having outer edge portions coöperating with the outer coils of said springs and central studs coöperating with the inner terminals of said springs, which consists in holding a spring with its terminals at opposite sides of a mandrel placed in engagement with the central stud of an article to receive said spring, compressing said spring about said mandrel, and forcing said spring from said mandrel into said article with its outer coil in engagement with the outer edge portion of said article.

5. The herein described method of inserting springs into spring receiving articles, which consists in holding a spring over an article to receive it, inserting a mandrel through said spring and into contact with said article, compressing said spring about said mandrel, and forcing said spring from said mandrel into said article.

6. The herein described method of applying springs having outer coils and free inner terminals to spring receiving articles having edge portions coöperating with the outer coils of said springs and central studs coöperating with the inner terminals of said springs, which consists in holding a spring over an article to receive it, inserting a mandrel between the terminals of said spring and into engagement with the central stud of said article, compressing said spring about said mandrel, and thereafter forcing said spring from said mandrel into said article.

7. The herein described method of inserting springs into spring receiving articles, which consists in providing a spring of an initially greater dimension than the corresponding dimension of the article to receive it, compressing said spring about a mandrel held in contact with said article to within the compass of said article, and forcing said spring from said mandrel into said article.

8. The herein described method of inserting springs into spring receiving articles which consists in providing a spring of an initially greater dimension than the corresponding dimension of the article to receive it, holding said spring over said article, inserting a mandrel through said spring into contact with said article, compressing said spring about said mandrel to within the compass of said article, and forcing said spring from said mandrel into said article.

9. The herein described method of inserting springs having inner and outer portions into spring receiving articles, which consists in compressing a spring about a mandrel held in contact with the article to receive said spring and forcing the inner portion of said spring from said mandrel into said article, and thereafter forcing the outer portion of said spring into said article.

10. The herein described method of applying springs having inner and outer portions to spring receiving articles having outer edge portions coöperating with the outer portions of said springs and central studs coöperating with the inner portions of said springs, which consists in compressing a spring about a mandrel held in engagement with the central stud of an article to receive said spring and forcing the inner portion of said spring into its operative position with respect to the stud of said article, and thereafter forcing the outer portion of said spring into said article and into its operative position with respect to the outer edge portion of said article.

11. The herein described method of applying springs having outer coils and free inner terminals to spring receiving articles having outer edge portions coöperating with the outer coils of said spring and central studs having slots to receive the inner terminals of said spring, which consists in providing a spring of initially greater diameter than the diameter of the article to receive it, compressing said spring about a mandrel held in engagement with the central stud of said article to within the compass of said article and forcing the inner terminals of said spring from said mandrel into positions to enter said slots, and thereafter forcing the outer coil of said spring into said article.

12. The herein described method of applying springs having outer coils and free inner terminals to spring receiving articles having outer edge portions coöperating with the outer coils of said springs and central studs having slots to receive the inner terminals of said springs, which consists in providing a spring of initially greater diameter than the diameter of the article to receive it, holding said spring over said article, inserting a mandrel between the terminals of said spring and into engagement with the central stud of said article, forcing the inner terminals of said spring from said mandrel into positions to enter said slots and compressing the outer coil of said spring to a diameter substantially corresponding to the diameter of said article, and thereafter forcing said outer coil into said article.

In testimony whereof I affix my signature.

ARTHUR J. LEWIS.